Dec. 1, 1936.  A. W. LE FEVRE  2,062,461
STRAIGHT SCALE SPEEDOMETER
Filed Oct. 4, 1934    2 Sheets-Sheet 1

Inventor
Arden W. LeFevre
By Williams, Bradbury, McCaleb & Hinkle
Attys.

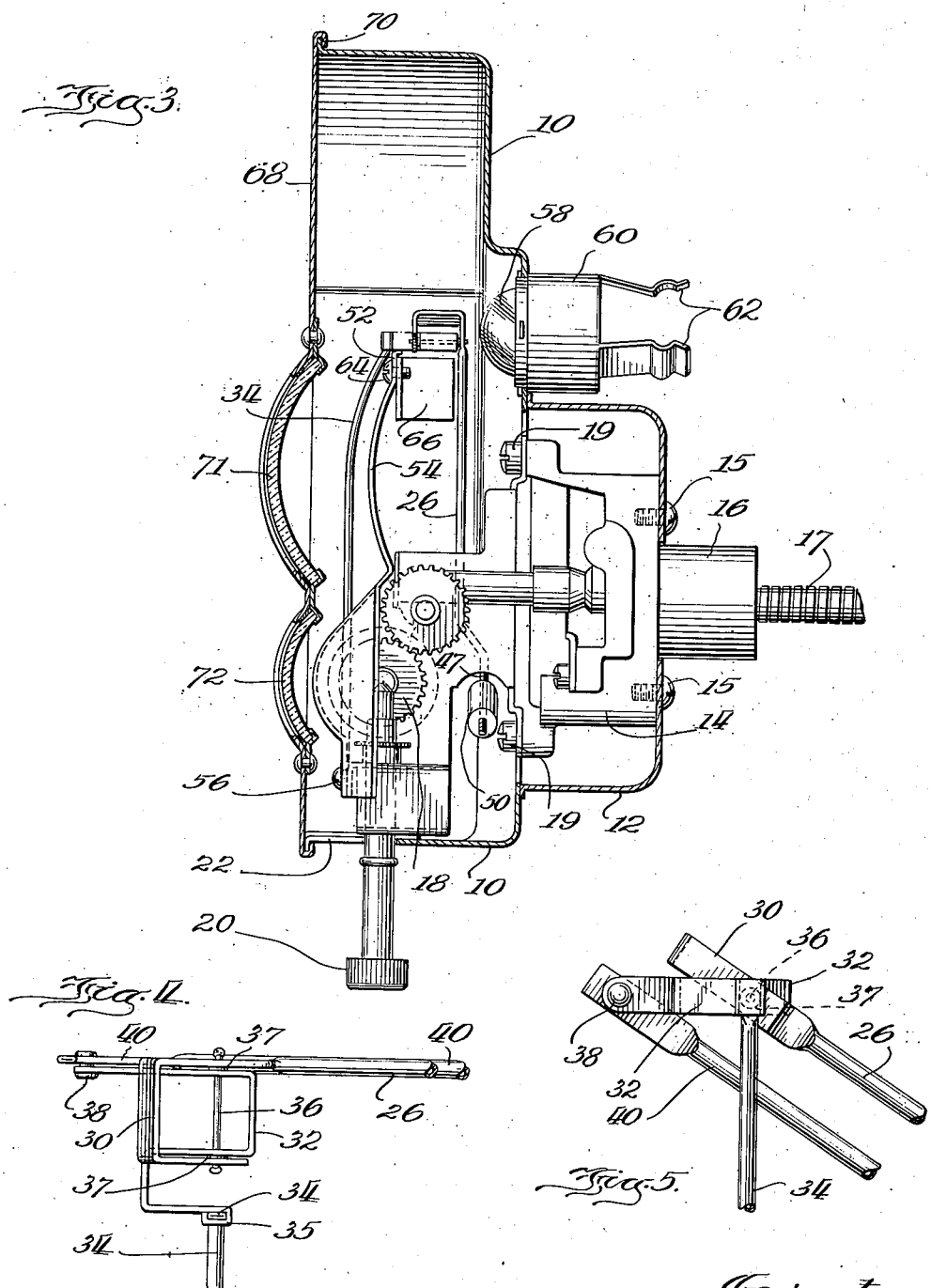

Patented Dec. 1, 1936

2,062,461

UNITED STATES PATENT OFFICE 2,062,461

STRAIGHT SCALE SPEEDOMETER

Arden W. Le Fevre, Chicago, Ill., assignor to Stewart-Warner Corporation, Chicago, Ill., a corporation of Virginia Application October 4, 1934, Serial No. 746,836

7 Claims. (Cl. 116—129)

My invention relates to a straight scale speedometer.

The primary object of my invention is to provide a speedometer which has a scale which is more easily readable than speedometer scales which have been used heretofore. The quick readability of a speedometer in an automobile is of great importance because it is obviously undesirable that the driver should be compelled to take his eyes from the road except momentarily in order to read the speedometer.

It has been customary to make speedometers in which a scale was inscribed on the periphery of a cylindrical cup. This cup was viewed through a window before which the indicating numerals passed. The window was provided with a fixed indicating pointer which registered with the various markings on the cylindrical cup. More recently it has been customary to use a circular scale with a movable indicating pointer which traverses a considerable arc of the circular scale. This is preferable to the cup type scale because the angular position of the indicating pointer and its position with regard to the whole scale are readily apparent even though the driver does not pause to read the numeral markings.

When such a circular scale is used, certain parts of the scale must of necessity be considerably removed from the upper edge of the instrument board unless the pointer traverses a very small arc. It is desirable that all of the scale should be as high on the instrument board as possible so that the driver can see the speedometer by looking only slightly below the lower edge of the windshield.

My straight scale speedometer permits a very quick readability because of the fact that the position of the pointer with relation to the whole scale is instantly visible, because the scale may be placed close to the upper edge of the instrument board, and because the indicating pointer and the scale markings are always erect so that no adjustment of the eye is necessary to accommodate angular displacement of the pointer.

A further object of my invention is to accommodate my straight scale speedometer to the conventional rotary acting speedometer mechanism.

Another object is to provide a straight scale speedometer which is of pleasing appearance and is inexpensive to manufacture.

In general I accomplish the results I am seeking by the very simple but novel expedient of using a parallelogram mechanism between the rotary spindle of the conventional speedometer mechanism and the indicating pointer.

A complete understanding of my invention may be had by reference to the accompanying drawings in which:

Fig. 3 is a vertical section of my straight scale speedometer taken substantially along line 3—3 of Fig. 1;

Fig. 4 is an enlarged plan view of the upper end of the parallelogram linkage; and Fig. 5 is an enlarged elevation of the upper end of the parallelogram linkage.

Figure 1:
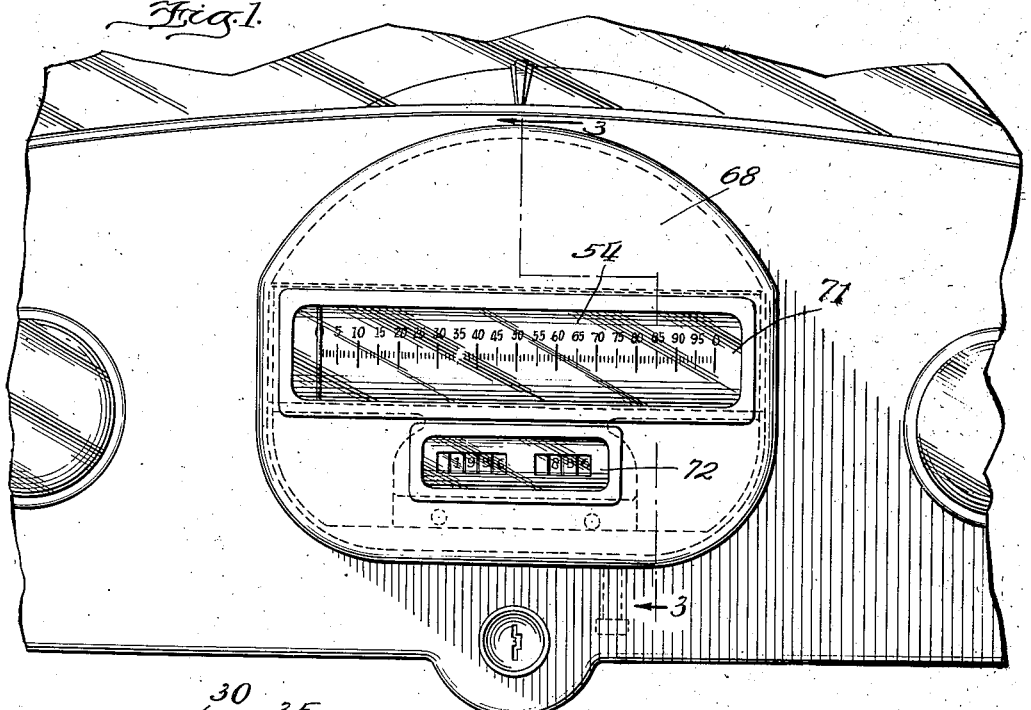
Fig. 1 is an elevation drawing of my straight scale speedometer.
Figure 2:
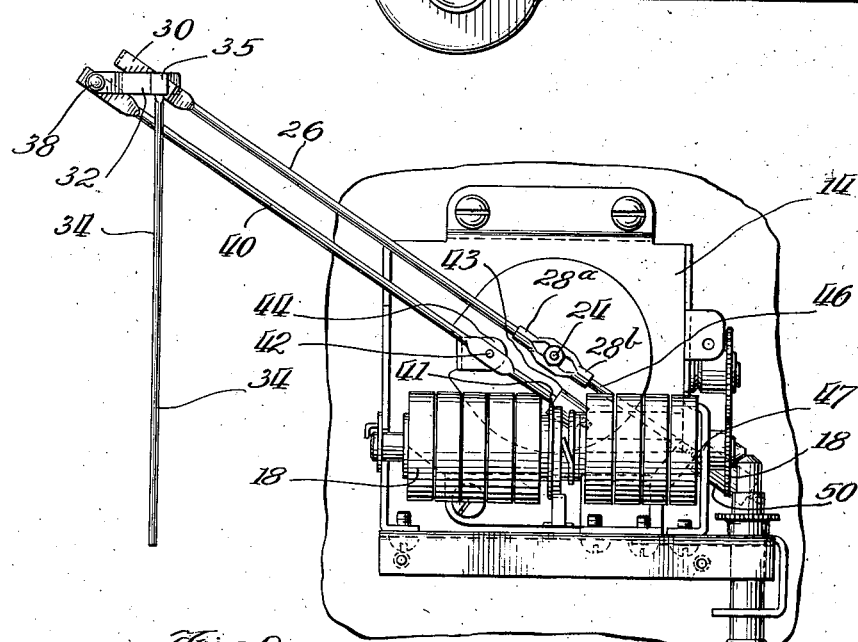
Fig. 2 is an elevation drawing of the mechanism and linkage of my straight scale speedometer before insertion within its case.

Referring now to the drawings (Figs. 1 and 3) I have provided a stamped metal casing 10 which is provided with a cup portion 12 and is adapted to receive as a unit the mechanism of my speedometer. This mechanism is best illustrated in Figs. 2 and 3. The speedometer mechanism 14, which may be of any conventional type, is secured to the cup portion 12 of the casing by screws 15. A bushing 16 protrudes from its back end through an opening provided in the cup portion 12 and is adapted for connection to an encased flexible shaft 17 by which it is driven. Mounted on the same frame as the speedometer mechanism 14 I have provided an odometer mechanism 18 which is connected by a suitable gearing to the flexible shaft. This mechanism is held in place by screws 19 threaded in the housing for the speedometer mechanism 14. The odometer is fitted with a reset knob 20 and a slot 22 is provided in the casing 10 to accommodate this reset knob. The assembled speedometer and odometer mechanisms may thus be inserted through the front opening in the casing 10 and secured to the cup portion 12 thereof by the screws 15.

This much of my mechanism is well known and therefore will not be described in further detail.

The speedometer mechanism 14 oscillates a spindle 24 which projects from the front of the housing for this mechanism, and has an actuating arm 26 mounted at the end thereof. This mounting is accomplished through a stamping 28 which is fixed to the shaft 24 by a force fit. This stamped member terminates in two tubular ends 28a and 28b and the actuating arm 26 is held by deforming the tubular portion 28a of the stamped member 28. It is important that the actuating arm 26 be made as light as possible and yet it must be strong and as rigid as possible. For this purpose I have found drawn aluminum tubing is very satisfactory. At its outer end the actuating arm 26 is flattened and bent rearwardly and then back upon itself (Fig. 4) to form a hooked portion 30 which provides two bearing points for connection with the horizontal cross link 32 from which the indicating pointer 34 depends. This cross link is provided with a portion which is bent in a reverse S fashion and is crimped over the indicating pointer 34 at its end 35. Pivotal connection with this cross link is made by means of a hardened pin 36 of a small diameter. This pin is flattened at its ends in order that it may not slip out of the bearing openings provided in the hooked portion 30 of the actuating arm 26 and the corresponding openings in the bent portion of the cross link 32. Small thin, flat washers 37 are provided to space the adjacent portions of the hook 30 and the link 32.

The cross link 30 is pivotally connected by a hardened pin 38 to an auxiliary guide arm 40 which is also made of drawn aluminum tubing. The guide arm is mounted on a pivot pin 42 which is mounted on a lug 44 which is attached to the frame or housing of the speedometer mechanism 14. The pivot pin 42 is horizontally spaced from the spindle 24 by a distance equal to the length between centers of the pins 36 and 38. In this manner it will be seen that a parallelogram linkage is provided which keeps the cross link 32 always in horizontal position. Accordingly the indicating pointer 34 is always maintained in vertical position.

To counterbalance the weight of this linkage I attach a counterbalance arm 46 to the tubular portion 28b of the stamping 28 in the same way as the actuating arm 26 is attached thereto. The arm 46 terminates in a screw threaded portion 47 upon which is screwed the counterbalance weight 50. By this screw thread attachment the counterbalance weight may be adjusted to accurate equilibrium with the weight of the linkage.

A similar counterbalance mechanism is provided on the auxiliary guide arm 40 by means of a continuation thereof, 40 having a screw threaded portion 41 and a counterbalance weight 43.

A rectilinear scale 52 having a convex portion 54 is attached to the odometer mechanism 18 by screws 56. It will be understood that this scale is located behind the indicating pointer 34 and in front of the actuating arm 26 and the auxiliary guide arm 40. The scale indicia are marked on the scale 54 as shown in Fig. 1.

This scale may be made of translucent material and provision for rear illumination may be made by means of the electric lamp 58 (Fig. 3) mounted through an opening in the case 10 and supported within a socket 60 which is provided with spring clips 62 for the reception and retention of an electrical plug (not shown). The ends of the scale are fastened by screws 64 to brackets 66 fastened to the casing 10.

The construction is completed by fastening to the front of the casing 10 a cover plate 68 which is crimped over a flanged edge 70 of the casing 10. The front plate 68 is provided with windows 71, 72 through which the speedometer scale and the odometer numeral wheels may be seen.

While I have thus described a preferred embodiment of my invention it will be understood that modifications and adaptations of my invention may be made without departing from the spirit of my invention as expressed in the appended claims.

I claim:

1. In a speedometer, the combination of a speed controlled spindle, an actuating arm secured thereto, a second arm pivoted about an axis horizontally spaced from that of said spindle, a link having its ends pivotally connected to the ends of said arms respectively, the effective length of said link being equal to the distance between the pivotal axes of said arms, a vertical pointer rigid with said link, and a graduated horizontal rectilinear scale cooperative with said pointer.

2. In a speedometer, the combination of a speed-controlled part, a pointer, a rectilinear scale, and a parallelogram linkage consisting of two arms each pivoted at one end and having a link rigid with said pointer joining their other ends, said linkage connecting said part and said pointer for imparting translatory movement to said pointer relative to said scale.

3. In a speedometer, the combination of an oscillatory spindle, a counterbalanced arm secured to said spindle, a second counterbalanced arm mounted for pivotal movement about an axis spaced from the axis of said spindle, a link pivotally connected to the ends of said arms respectively and holding them in parallel spaced relation, a pointer secured to said link, and a rectilinearly graduated scale adjacent the path of movement of said pointer.

4. In a speedometer, the combination of a pivoted arm movable in accordance with speed, said arm having a U-shaped bend formed in the end thereof, a second arm mounted for free pivotal movement about an axis spaced from the axis of said first arm, a link having portions lying adjacent the parallel portions of said U-shaped bend respectively, a pin extending through the adjacent portions of said bend and of said link, means pivotally connecting the end of said second arm to said link, and a pointer rigidly secured to said link.

5. In an indicator, the combination of a rectilinear scale, a pointer, and a parallelogram linkage for moving said pointer relative to said scale, said linkage comprising a pair of parallel arms each pivoted at one end, and a link fixed to said pointer and pivotally connected to the other ends of said arms.

6. In an indicator, the combination of a graduated rectilinear scale, a pair of pivoted arms, a link pivotally connected at its ends to the ends of said arms respectively, counterbalancing means for said arms, and a pointer secured to said link.

7. In a speedometer, the combination of an oscillatory spindle, an arm secured to said spindle, a second arm mounted for pivotal movement about an axis spaced from the axis of said spindle, means for counterbalancing said arms, a link pivotally connected to the ends of said arms respectively and holding them in parallel spaced relation, a pointer secured to said link, and a rectilinearly graduated scale adjacent the path of movement of said pointer.

ARDEN W. LE FEVRE.